C. G. ETTE.
INSULATOR PIN.
APPLICATION FILED MAY 4, 1908.
906,787.
Patented Dec. 15, 1908.
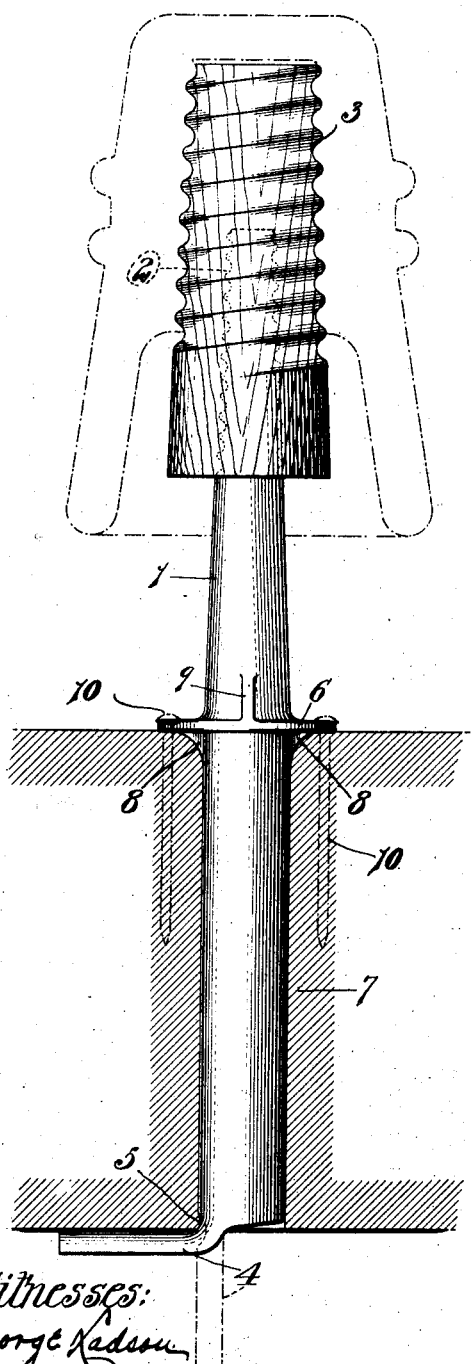
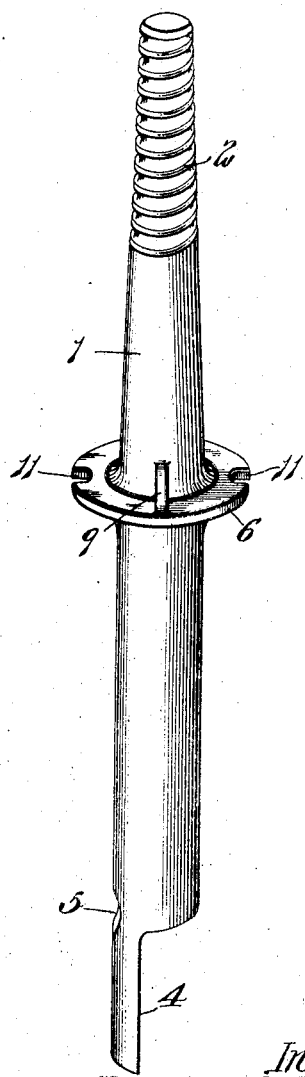
Witnesses:
George Kadson
Wells L. Church
Inventor,
Charles G. Ette.
By Bakewell & Cornwell Attys.

UNITED STATES PATENT OFFICE.

CHARLES G. ETTE, OF ST. LOUIS, MISSOURI, ASSIGNOR TO ETTE INVESTMENT COMPANY, OF ST. LOUIS, MISSOURI, A CORPORATION OF MISSOURI.

INSULATOR-PIN.

No. 906,787.  Specification of Letters Patent.  Patented Dec. 15, 1908.

Application filed May 4, 1908. Serial No. 430,765.

*To all whom it may concern:*

Be it known that I, CHARLES G. ETTE, a citizen of the United States, residing at St. Louis, Missouri, have invented a certain new and useful Improvement in Insulator-Pins, of which the following is a full, clear, and exact description, such as will enable others skilled in the art to which it appertains to make and use the same, reference being had to the accompanying drawings, forming part of this specification, in which—

Figure 1 is an elevational view showing an insulator pin constructed in accordance with my invention arranged in operative position on a support; and Fig. 2 is a perspective view of the pin with the head removed.

This invention relates to insulator pins, and particularly to that type of insulator pins which comprise a metal shank provided with a wooden head on which the insulator is mounted.

The main object of my invention is to provide an insulator pin of the type referred to which can be produced at a low cost.

Another object of my invention is to provide a metallic insulator pin having an integral portion that is adapted to be bent into engagement with the support through which the pin extends, thus overcoming the necessity of using a nut to lock the pin in operative position.

Referring to the drawings which illustrate the preferred form of my invention, 1 designates a metallic pin having a screw-threaded portion 2 on which a non-metallic head 3 is mounted, said head being provided with external screw-threads that coöperate with screw-threads on the interior of an insulator, as shown in Fig. 2. The pin 1 is provided at its lower end with an integral tongue 4, and a groove 5 is formed in the outer surface of the pin just above the point where the tongue 4 is connected to the pin, as shown clearly in Fig. 2. The pin is also provided with a ring-shaped flange 6 that prevents water from running down into the opening in the support 7 in which the pin is mounted, and on the underneath side of said flange are oppositely disposed ribs that sink into the support and thus prevent the pin from turning therein. The ribs 8 preferably merge into the shank of the pin, as shown in Fig. 1, and on the upper side of the flange 6 are tapered ribs 9 that also merge into the pin and strengthen the flange 6.

To arrange the pin in operative position I first form a hole in the support and drop the pin into same and then bend the tongue 4 laterally to engage the underneath side of the support, as shown in Fig. 1, the groove 5 which is formed in the outer surface of the pin permitting the tongue 4 to bend easily.

The pin is preferably formed from malleable iron so that the tongue 4 will bend readily but if the tongue should break off the pin can be locked in position by means of one or more nails 10 that are driven into the upper side of the support, as shown in dotted lines in Fig. 1, the flange 6 on the pin being provided with notches 11 through which said nails extend. An insulator pin of this construction can be produced at a low cost. It is locked in position by an integral locking device 4 which cannot work loose. And as the pin is connected to the support by merely bending over the tongue 4 the pin can be arranged in operative position more quickly than would be possible if a nut were employed to connect the pin to the support.

While I prefer to provide the pin with a tongue 4 that is located at one side of the pin I do not wish it to be understood that my broad idea is limited to such a construction for the tongue 4 could be located at the longitudinal center of the pin without departing from the spirit of my invention. Neither do I wish it to be understood that my invention is limited to a construction comprising a metallic pin provided with a head of insulating material, for, if desired, the pin can be provided with a screw-threaded portion of sufficient diameter to coöperate with the internal threads on the insulator.

Having thus described my invention, what I claim as new and desire to secure by Letters Patent is:

1. A metallic insulator pin provided at its lower end with an integral tongue that is adapted to be bent into engagement with the support in which the pin is mounted; substantially as described.

2. A metallic insulator pin provided at its lower end with an integral tongue that is adapted to be bent into engagement with the support in which the pin is mounted, and a groove formed in the outer surface of the pin adjacent the point where the tongue is connected to the pin; substantially as described.

3. A metallic insulator pin provided at its upper end with a screw-threaded portion, a non-metallic head mounted on said screw-threaded portion, and an integral portion at the lower end of said pin which is adapted to be bent into engagement with the support in which the pin is mounted; substantially as described.

4. A metallic insulator pin provided at its upper end with a screw-threaded portion, a non-metallic head mounted on said screw-threaded portion, an integral portion at the lower end of said pin which is adapted to be bent into engagement with the support in which the pin is mounted, and a ring-shaped flange on said pin which prevents water from running into the opening in the support in which the pin is mounted; substantially as described.

5. A metallic insulator pin provided at its upper end with a screw-threaded portion, a non-metallic head mounted on said screw-threaded portion, an integral portion at the lower end of said pin which is adapted to be bent into engagement with the support in which the pin is mounted, and a ring-shaped flange on said pin which prevents water from running into the opening in the support in which the pin is mounted, said flange being provided with notches that are adapted to receive fastening devices driven into said support; substantially as described.

6. A metallic insulator pin provided with a ring-shaped flange for preventing water from running into the opening in the support in which the pin is mounted, ribs on the underneath side of said flange for preventing the pin from turning, and an integral tongue on the lower end of said pin which is adapted to be bent into engagement with said support, the pin being provided adjacent said tongue with a groove which permits said tongue to be bent easily; substantially as described.

In testimony whereof I hereunto affix my signature in the presence of two witnesses, this twenty-ninth day of April 1908.

CHARLES G. ETTE.

Witnesses:
WALTER CLARENCE RAITHEL,
EDWARD SCHWIDDE.